US009454921B2

(12) United States Patent
Williams et al.

(10) Patent No.: US 9,454,921 B2
(45) Date of Patent: Sep. 27, 2016

(54) INTEGRATED SECURITY SYSTEM FOR WARNING OF DANGEROUS SUBSTANCES THAT ARE DISPERSED BY WINDS

(71) Applicant: Wind Willie, LLC, Levelland, TX (US)

(72) Inventors: Larry Eugene Williams, Levelland, TX (US); Nickey Joe Williams, Levelland, TX (US); Benny Ray Sherrod, Midland, TX (US); Roger Dale Hayes, Amarillo, TX (US)

(73) Assignee: Wind Willie, LLC, Levelland, TX (US)

( * ) Notice: Subject to any disclaimer, the term of this patent is extended or adjusted under 35 U.S.C. 154(b) by 186 days.

(21) Appl. No.: 14/224,065

(22) Filed: Mar. 24, 2014

(65) Prior Publication Data
US 2015/0269877 A1    Sep. 24, 2015

(51) Int. Cl.
*G01P 13/00* (2006.01)
*G09F 15/00* (2006.01)
*G01P 13/02* (2006.01)
*G08B 21/16* (2006.01)
*G09F 7/00* (2006.01)

(52) U.S. Cl.
CPC ........... *G09F 15/0087* (2013.01); *G01P 13/02* (2013.01); *G08B 21/16* (2013.01); *G09F 7/002* (2013.01); *G09F 15/0037* (2013.01)

(58) Field of Classification Search
None
See application file for complete search history.

(56) References Cited

U.S. PATENT DOCUMENTS

| | | |
|---|---|---|
| 1,555,102 A | 9/1925 | Chatfield |
| 2,491,176 A | 12/1949 | Hammond |
| 2,749,751 A | 6/1956 | Hastings |
| 3,691,829 A | 9/1972 | Perry |
| D513,197 S | 12/2005 | Damberger |
| 7,685,754 B1 | 3/2010 | Torres |
| 2005/0187677 A1 | 8/2005 | Walker |
| 2007/0132601 A1* | 6/2007 | Al-Wehebi ............. G01P 13/02 340/632 |
| 2007/0223841 A1 | 9/2007 | Weinzapfel |
| 2011/0027781 A1 | 2/2011 | Langlois |
| 2011/0158804 A1* | 6/2011 | Smith ................... F03D 1/0675 416/1 |
| 2012/0047976 A1* | 3/2012 | Vanderhye ............ B01D 53/62 71/61 |
| 2012/0121416 A1* | 5/2012 | Sauer, Jr. ................ F03D 3/065 416/132 B |
| 2012/0301301 A1* | 11/2012 | Sauer ..................... F03D 3/065 416/170 R |
| 2014/0097621 A1* | 4/2014 | Kassianoff ............... B63H 1/36 290/55 |

FOREIGN PATENT DOCUMENTS

CA    2520614 A1 *   4/2006   .......... B63H 9/0607

* cited by examiner

*Primary Examiner* — Andre Allen
(74) *Attorney, Agent, or Firm* — Shannon L Warren

(57) ABSTRACT

A wind-articulated, warning sign system responsive to oblique wind currents acting external to surfaces of its exposed, non-flat-sheet and non-fabric structural elements and which provides a functional-airfoil-cross-section with surface configured to display and provide emergency critical technical data for specific classes of regular and emergency visitors to the entrance portal of an industrial site where large quantities of dangerous substances, including, radioactive, flammable, explosive, corrosive, oxidizing, asphyxiating, biohazardous, toxic, pathogenic, or allergenic substances are handled and which substances might be released by accident or by terrorist attack and dispersed by winds into the local environment.

20 Claims, 11 Drawing Sheets

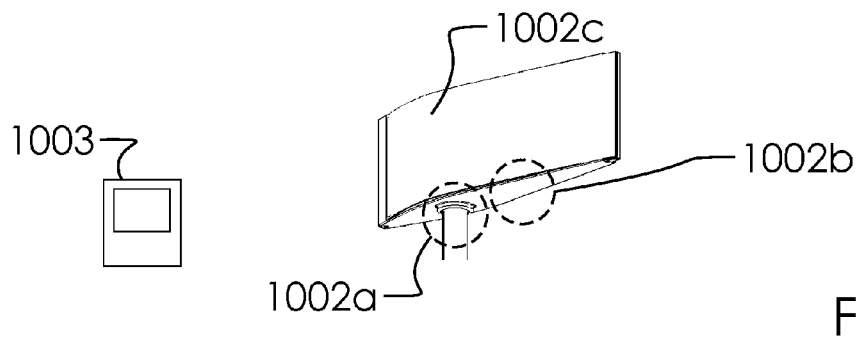
Fig. 10A
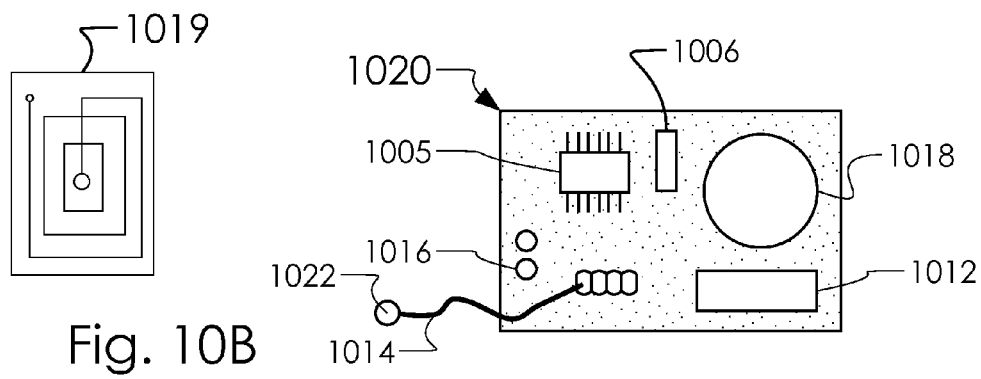
Fig. 10B
Fig. 10C
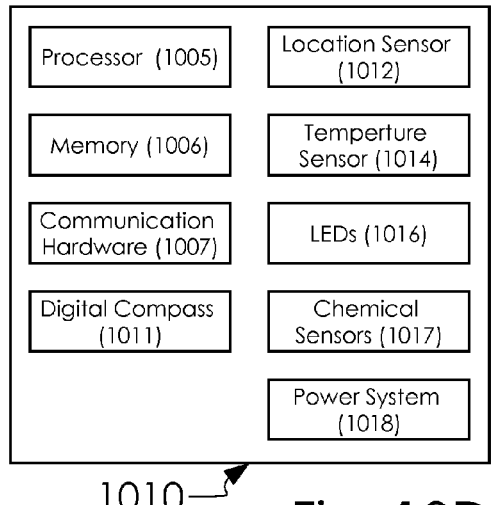
Fig. 10D
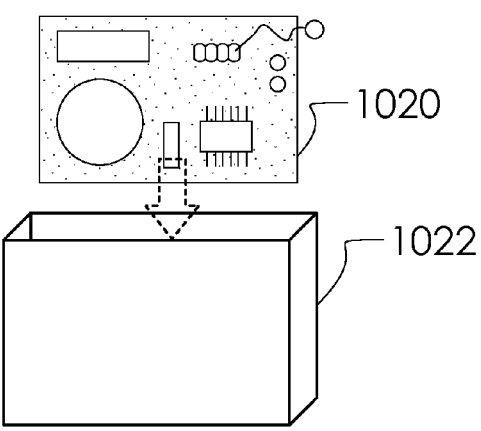
Fig. 10E

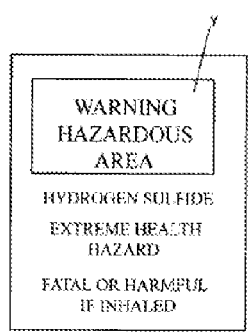
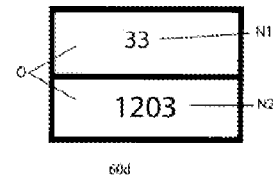
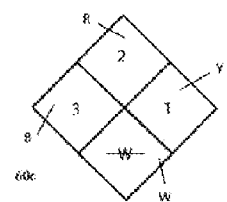
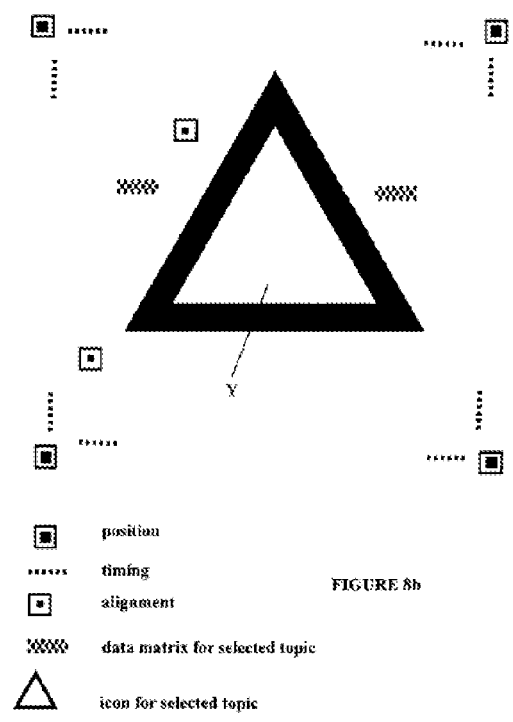
Fig. 11A            Fig. 11B

INTEGRATED SECURITY SYSTEM FOR WARNING OF DANGEROUS SUBSTANCES THAT ARE DISPERSED BY WINDS

CROSS-REFERENCE TO RELATED APPLICATIONS

This application claims the benefit of these US and PCT patent applications: utility application Ser. No. 12/576,395 filed on 2009 Oct. 9; design application No. 29/373,484 filed on 2011 Apr. 13; utility application Ser. No. 13/066,382 filed on 2011 Apr. 13; PCT/US2012/033186 filed on 2012 Apr. 12; and design application No. 29/476,089 filed on 2013 Dec. 10. The subject matter and disclosures of these applications are hereby incorporated by reference.

This is the second utility CIP filed on the basis of the 2009 utility application. Note that utility application Ser. No. 13/066,382 (filed on 2011 Apr. 13) is under a notice of allowance at the time that this application is to be filed, and the issue fee for that application will be paid immediately after this application is filed.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

This disclosure relates generally to a warning sign system. A complete listing of prior art, referenced by Examiners in the cross-referenced applications, is included in an Information Disclosure Statement filed herewith. However, none of the known inventions and patents, taken either singularly or in combination, is seen to describe the instant disclosure as claimed. Accordingly, an improved warning sign system would be advantageous.

In general, previous articulated, customizable signs fall into several US Classes including: 1 16, 73, D10 and D20. At this moment no class description could be found which includes the concepts of warning signs with special utility or application toward instantaneous display of specific predetermined topic-related displays by means of RFID systems or web-related QR codes. Searching in April 2011 confirmed the existence of about 113 grants with the text string "warning sign" in the claims. Upon close inspection, none was found which discloses or claims dynamic security systems with real-time web links especially configured for support of first-responders in accidents or terrorist attacks. Presumably, if there were applications which disclose actual apparatus, methods and systems similar to those of the present invention, they would already be held as secret within the USPTO under national security provisions, 35 USC 181.

Global political and economic conditions now require extraordinary security for oil and gas facilities, especially remote wells, pipelines and field-processing sites. Part of this challenge is to provide reliable, secure, instant access to infrastructure records, data and emergency procedures to authenticated individuals having a confirmed need to know and to federal/state governmental agencies, especially the US Dept. of Homeland Security. Normal safety aspects toward the adjoining communities, e.g., warning signs and standard response procedures for a well are typically covered by the property owner or licensee. Compliance of each site with state and industry codes (API, American Petroleum Institute) for natural gas-production is confirmed by regular inspections required by the controlling state and local agencies, e.g., TX-RRC. The required API number display consists of 14 digits with 4 separator dashes which specifies the state, the county, the unique well identifier, 2 sidetrack digits and 2 event/sequence code characters. In case of a major emergency at a particular location, US federal agencies may also be involved under "Emergency Support Function #9".

In case of an accident or a terrorist attack on a remote gas-production facility, all emergency responders need a simple, quick, universal system to provide their crews with detailed, updated technical data on many important matters including: property control-ownership, health and safety risks, emergency-contact data for responsible managers 1 supervisors, building drawings, wiring and electrical power equipment locations, piping and control valves for fluids handled at the site, dangerous materials storage, etc.

In contrast to past practice of merely posting a minimal, API-compliant, flat metal ID sign near the well-head or pipeline access, the present warning system includes an active display of wind direction and velocity are the possible formation of a drift plume due to accidental release of hazardous gases. In addition, the apparatus confirms the visitor's identity, facilitates RFID data interchanges and enables secure web links to offsite data on selected critical factors pertinent to accidents at the site. The present invention is an integrated warning and security system for gas production facilities which is also able to confirm the identity of each emergency responder prior to allowing wireless display, on a laptop computer, of information critical for a range of particular emergency-management scenarios.

A number of US Federal agencies, particularly DHS (Dept. of Homeland Security), are active in monitoring sites where dangerous materials or toxic chemicals are handled in order to assist in prevention of terror attacks and managing emergency responses in case of a situation which may threaten the health of regional populations. These agencies include: Department of Agriculture Department of Commerce, Department of Defense, Department of Health and Human Services, Department of the Interior, Department of Justice, Department of Labor, Department of Transportation, National Aeronautics and Space Administration and U.S. Agency for International Development.

The present invention is an apparatus and advanced system of information display adjacent the entrance of a site where large quantities of toxic fluids may be released in an accident or by terrorist attack. The displays of the system are configured to present just the appropriate information reasonable and specific to the particular visitor's purpose. For example a gas-production-reporting compliance inspector for a State Resources Commission would not be interested in complex modeling data on the probable extent and concentration profiles of a toxic-release plume under certain weather conditions—which would be critical for high-level FEMA managers. The following discloses apparatus and inherent-intrinsic use methods thereof along with a system of triage-ordered display sequences of action items tailored especially to meet the needs of visitors including: regular business calls, regulatory and law enforcement site visitors as well as those of possible emergency responders.

Few other moments in recent history present such challenges for conventional signage and hazard displays. In the case of a facility drawing massive quantities of hydrocarbons from deep within the earth or ocean, the technology for fluid recovery has far outstretched the capability for dealing with massive accidental or intentional releases above ground. Effective emergency management depends upon having a response plan ahead of time which anticipates the probable scenarios and identifies and ranks the optimal responses. These were the missing links in dealing with the recent release of crude oil in the Gulf of Mexico.

BRIEF SUMMARY OF THE INVENTION

A wind-articulated, warning sign system responsive to oblique wind currents acting external to surfaces of its exposed, non-flat-sheet and non-fabric structural elements and which provides a functional-airfoil-cross-section with surface configured to display and provide emergency critical technical data for specific classes of regular and emergency visitors to the entrance portal of an industrial site where large quantities of dangerous substances, including, radioactive, flammable, explosive, corrosive, oxidizing, asphyxiating, biohazardous, toxic, pathogenic, or allergenic substances are handled and which substances might be released by accident or by terrorist attack and dispersed by winds into the local environment.

BRIEF DESCRIPTION OF THE SEVERAL VIEWS OF THE DRAWINGS

FIGS. 4A and 4B illustrate an elevated side and front view of said warning sign system 100 without said first face 202a.

FIGS. 10A, 10B, 10C, 10D and 10E illustrate a perspective overview of said sign portion 102 with a handheld reader 1003, a short range communication chip 1019, a system-on-a-chip 1020, a component diagram 1010, and an encasement 1022 for said system-on-a-chip 1020.

FIGS. 11A and 11B illustrate shows five typical, traditional risk/warning images indicating different hazards from toxic-poisonous to flammable/explosive classifications.

FIG. 11B illustrates how the basic components of the Denso•type QR code are meshed with the superimposed traditional, specific-class warning image.

DETAILED DESCRIPTION OF THE INVENTION

Described herein is a warning sign system. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
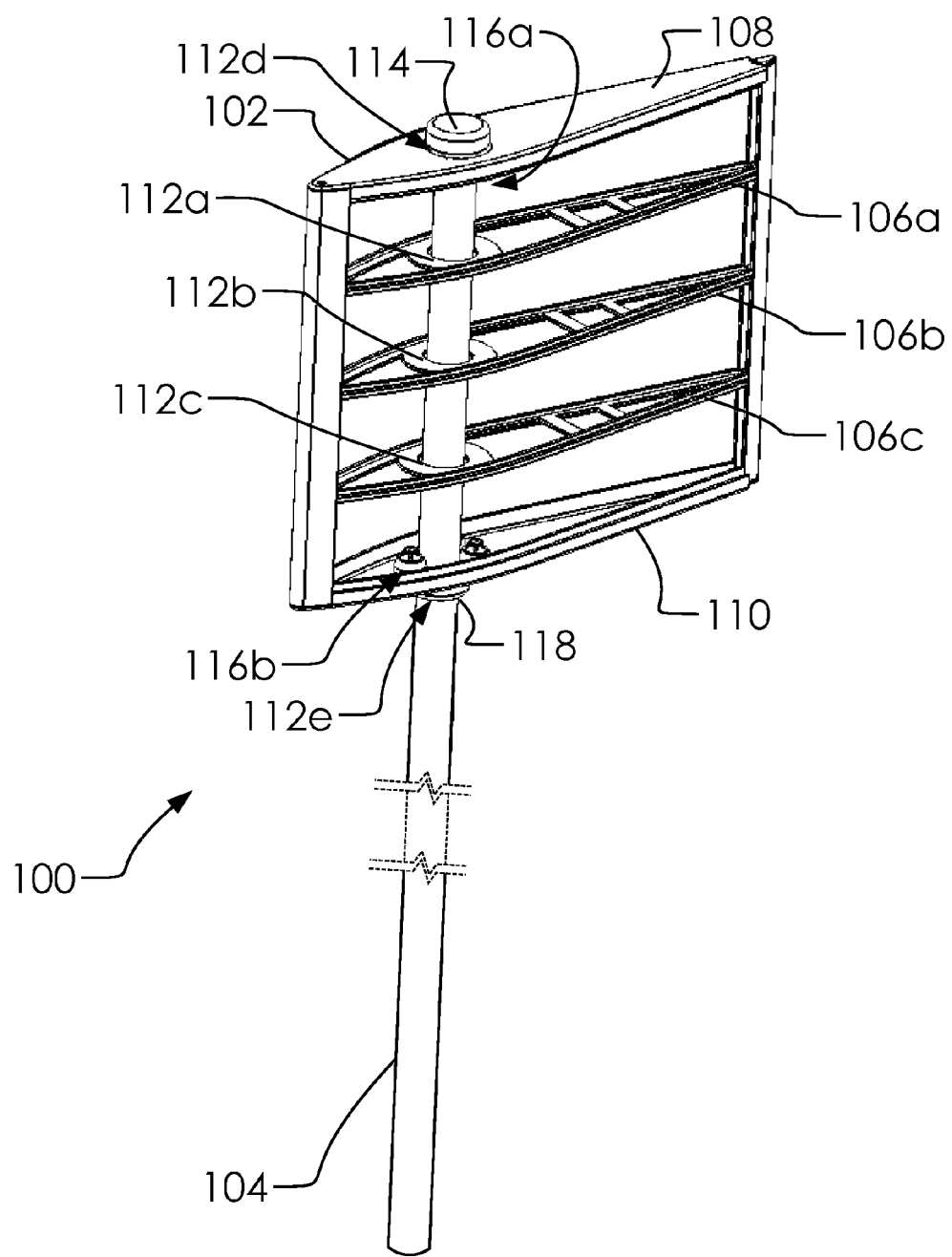
FIG. 1 illustrates a perspective overview of a warning sign system 100.

FIG. 1 illustrates a perspective overview of a warning sign system 100. In one embodiment, said warning sign system 100 can comprise a sign portion 102 and a mast 104. In one embodiment, said sign portion 102 can comprise a plurality of ribs (which can comprise a first rib 106a, a second rib 106b, and a third rib 106c), a top 108, a bottom 110, a plurality of mast apertures (which can comprise a first mast aperture 112a, a second mast aperture 112b, a third mast aperture 112c, an upper mast aperture 112d, and a lower mast aperture 112e), a upper plug assembly 114, an upper bearing assembly 116a (not illustrated here), a lower bearing assembly 116b, and a lower collar 118. In one embodiment, said upper bearing assembly 116a and said lower bearing assembly 116b can be collectively referred to as a one or more bearing assemblies.

Figure 2A:
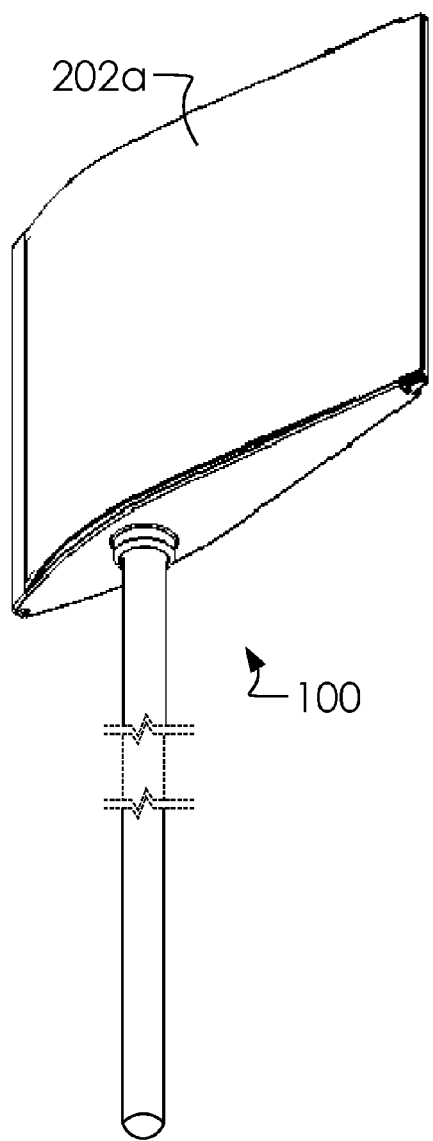
FIGS. 2A and 2B illustrate a perspective front and rear view of said warning sign system 100, with a one or more faces (which can comprise a first face 202a and a second face 202b) over said sign portion 102.
Figure 2B:
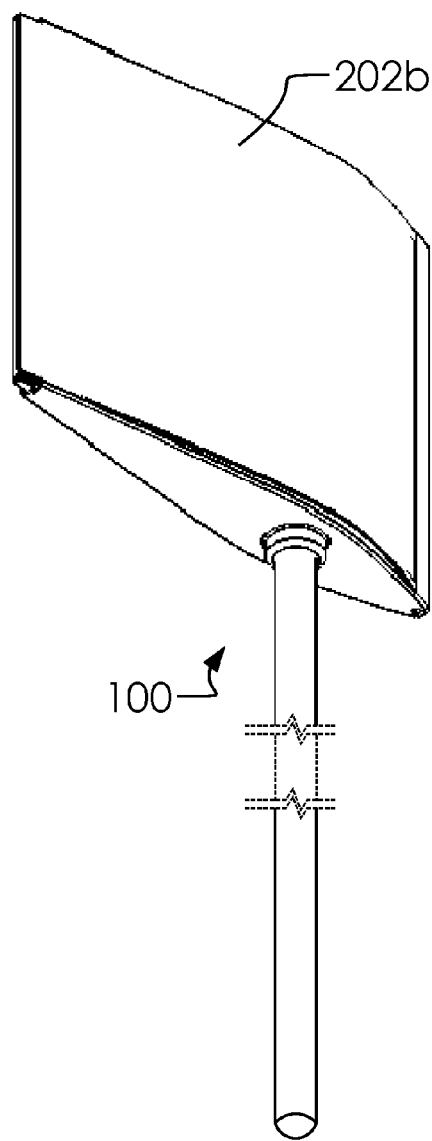

FIGS. 2A and 2B illustrate a perspective front and rear view of said warning sign system 100, with a one or more faces (which can comprise a first face 202a and a second face 202b) over said sign portion 102.

Figure 3:
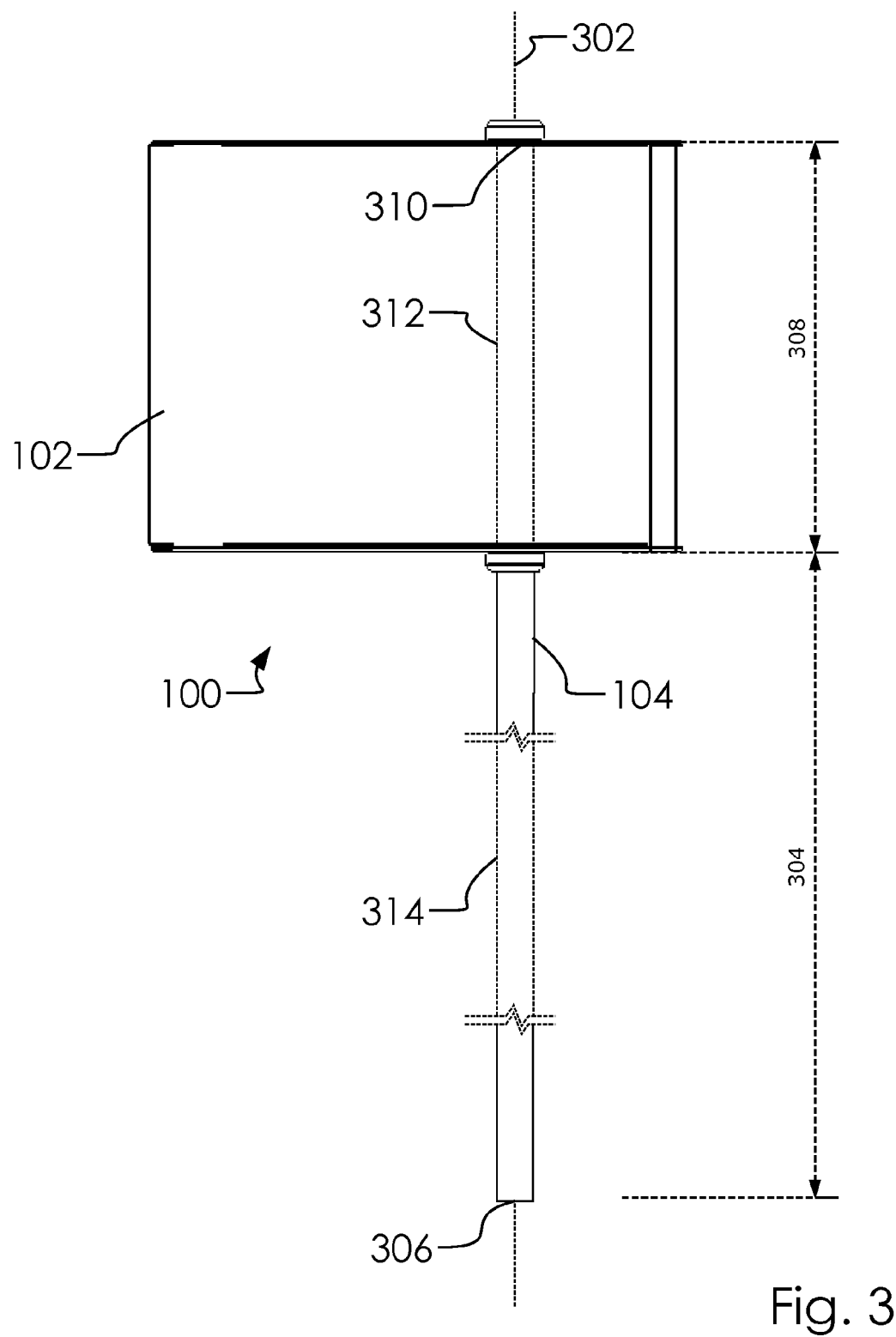
FIG. 3 illustrates an elevated rear view of said warning sign system 100.

FIG. 3 illustrates an elevated rear view of said warning sign system 100. In one embodiment, said sign portion 102 can rotate freely on an central axis 302; wherein, said central axis 302 can comprise a central axis of said mast 104. In one embodiment, said sign portion 102 can attach to said mast 104 at a first distance 304 above a bottom 306 of said mast 104. In one embodiment, said first distance 304 can be a second distance 308 below a top 310 of said mast 104. In one embodiment, a portion of said mast 104 above said first distance 304 can comprise an upper portion 312 and the remainder of said mast 104 can comprise a lower portion 314.

Figure 4:
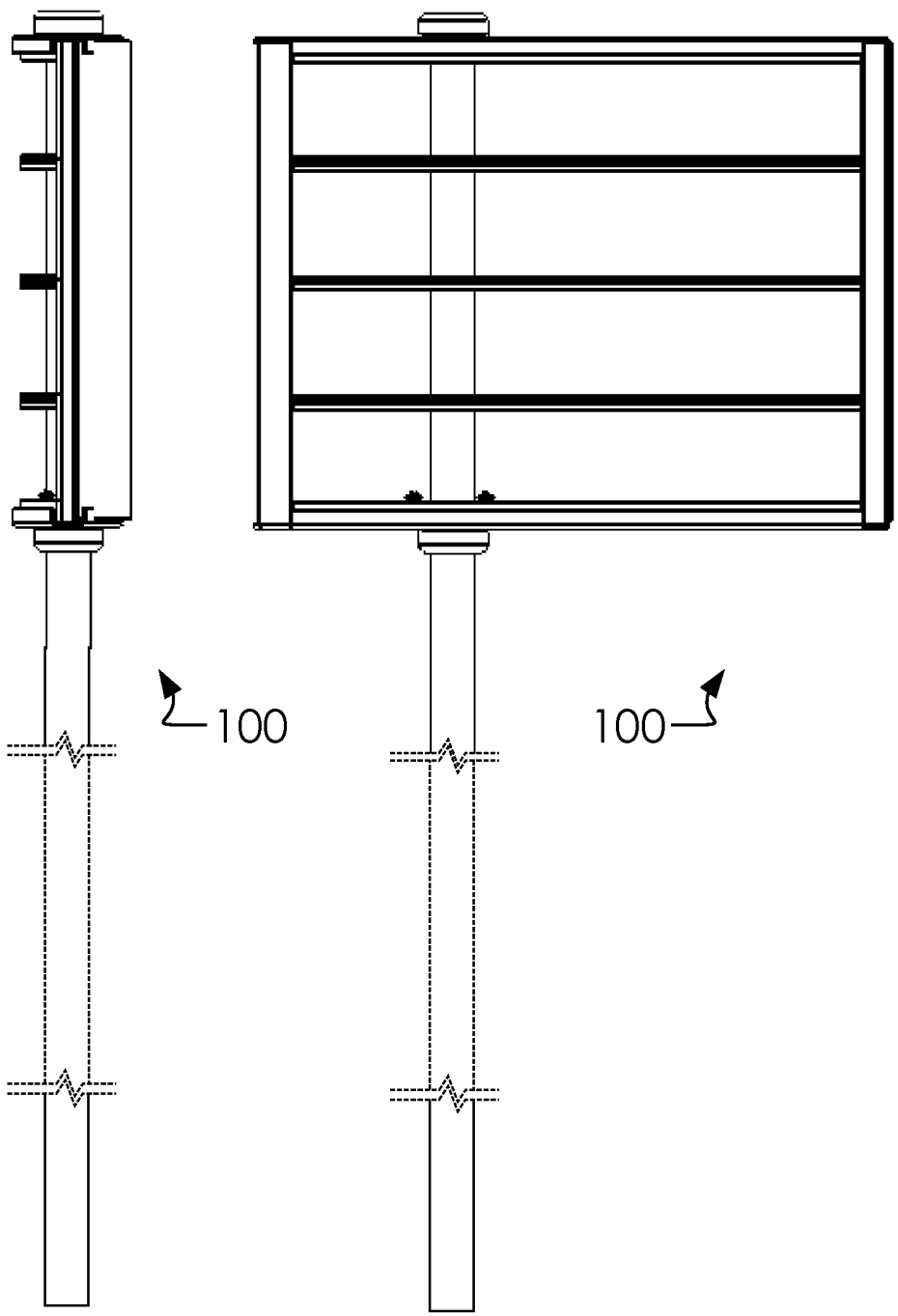

FIGS. 4A and 4B illustrate an elevated side and front view of said warning sign system 100 without said first face 202a.

Figure 5:
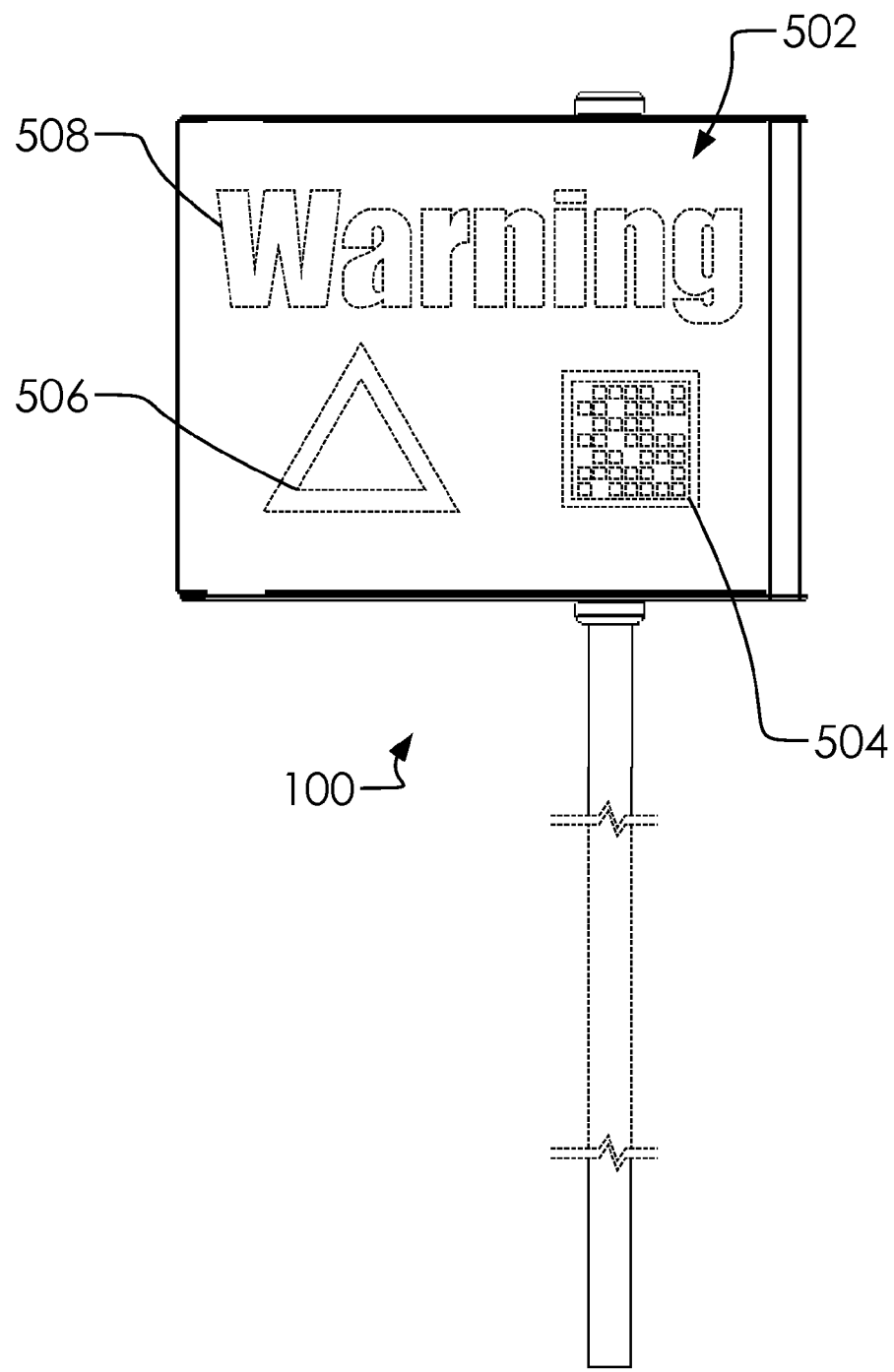
FIG. 5 illustrates a rear view of said warning sign system 100 with a one or more indicia 502 on said second face 202b.

FIG. 5 illustrates a rear view of said warning sign system 100 with a one or more indicia 502 on said second face 202b. In one embodiment, said one or more indicia 502 can comprise a computer readable printed code 504 (such as a bar code, a QR code, or similar), a one or more symbols 506, and/or a one or more printed text warnings 508.

Figure 6A:
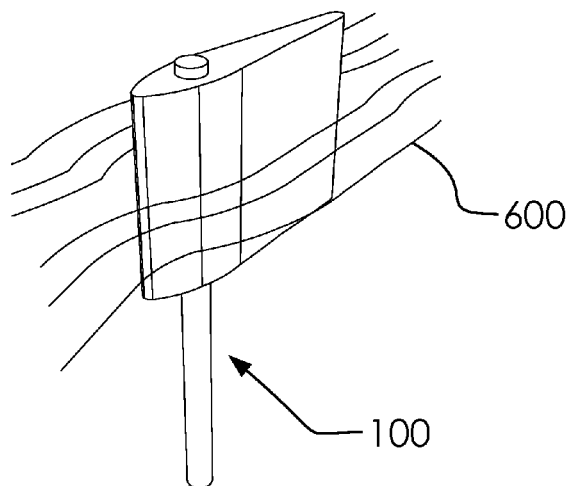
FIGS. 6A and 6B illustrate a perspective overview and an elevated top view of said warning sign system 100 with a plurality of air flows 600.
Figure 6B:
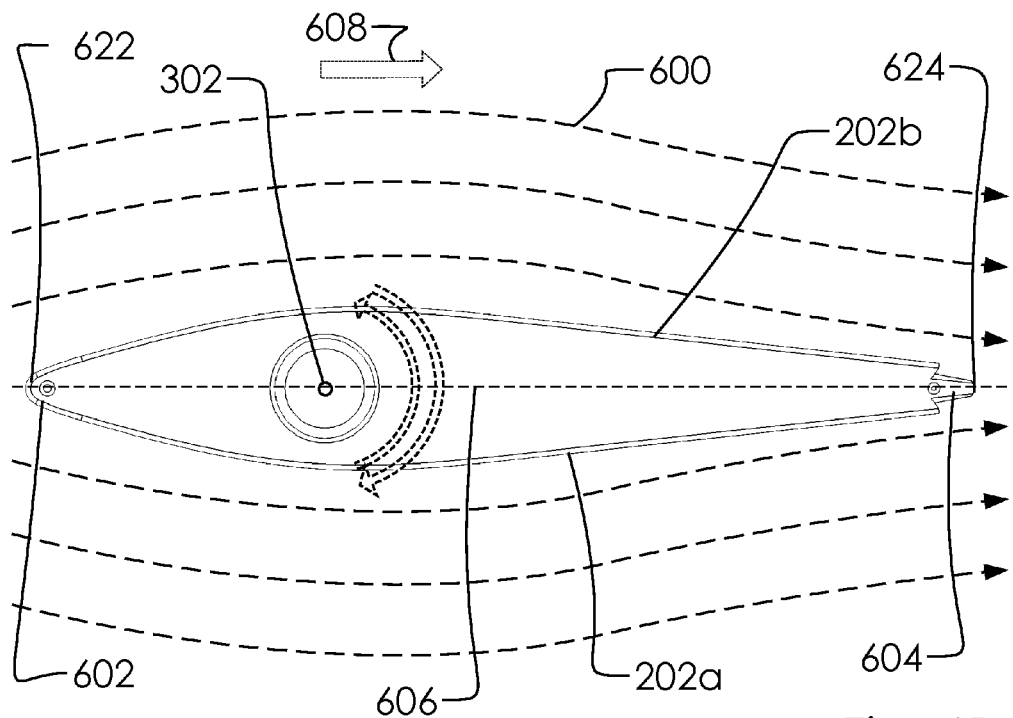

FIGS. 6A and 6B illustrate a perspective overview and an elevated top view of said warning sign system 100 with a plurality of air flows 600. In one embodiment, said sign portion 102 can comprise an air foil like shape having a leading edge 602, a trailing edge 604 and said one or more faces, as illustrated. In one embodiment, unlike many air foils, said sign portion 102 does not have an asymmetrical shape. For example, in one embodiment, said sign portion 102 can be substantially symmetrical about a horizontal axis 606. Accordingly, unlike an aviation air foil which creates lift, said sign portion 102 can create an equilibrium as between said plurality of air flows 600 flowing past said one or more faces. Accomplishing this equilibrium can comprise allowing said sign portion 102 to rotate freely on said central axis 302 of said mast 104. Accordingly, said sign portion 102 rotates relative to said mast 104 to create an equilibrium in said plurality of air flows 600 around said sign portion 102. Accordingly, said horizontal axis 606 can be aligned with a prevailing winds 608.

In one embodiment, said leading edge 602 can comprise a one or more leading edge lights 622 and said trailing edge 604 can comprise a one or more trailing edge lights 624. In one embodiment, said one or more leading edge lights 622 and said one or more trailing edge lights 624 can have different colors from one another; wherein, a user of said warning sign system 100 can know which direction the wind is blowing by observing a color of lights pointed toward him, or otherwise, the colors of the lights according to a profile of said warning sign system 100. One example of this principle can comprise using a red light on said trailing edge 604 for said one or more trailing edge lights 624 and a white light on said leading edge 602 for said one or more leading edge lights 622, which would correspond to the colors of a car's headlights and tail lights. Other examples of lighting schemes can be found in aviation and naval vessels which have different colored lights on their extremities so indicate direction of movement in the dark.

Figure 7A:
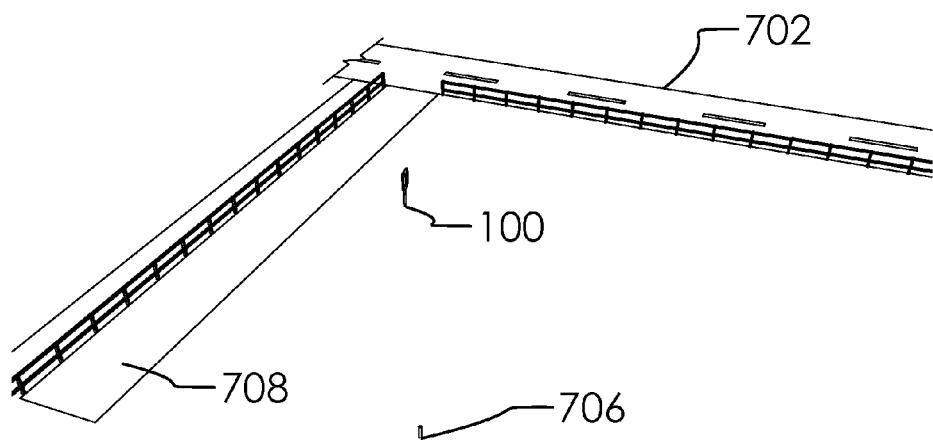
FIGS. 7A and 7B illustrate a perspective overview and an elevated top view of said warning sign system 100 in a field 704.
Figure 7B:
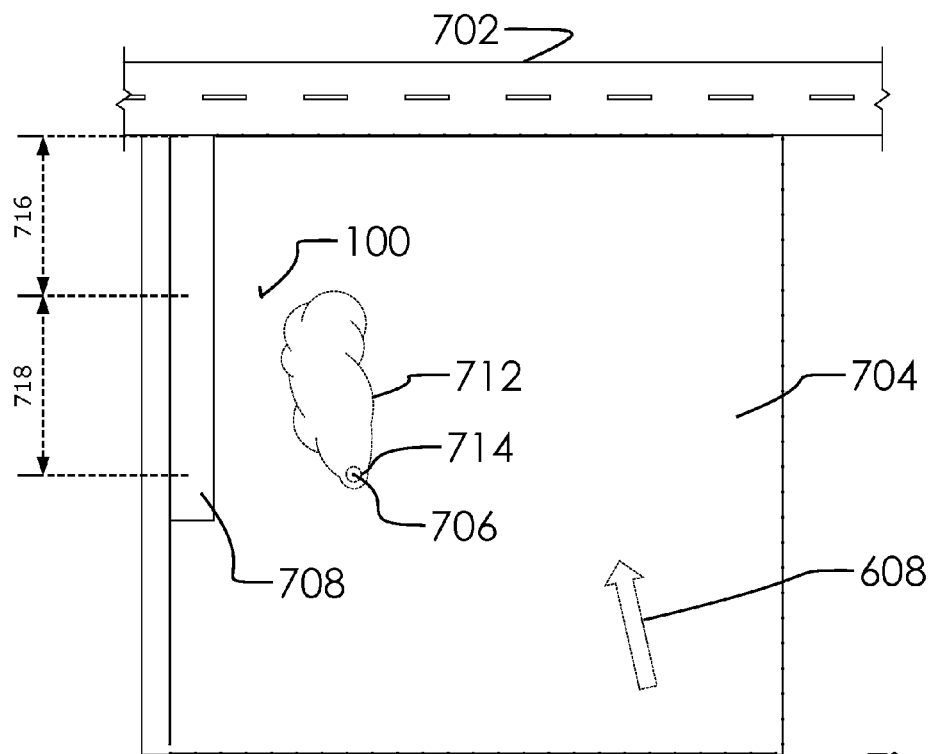

FIGS. 7A and 7B illustrate a perspective overview and an elevated top view of said warning sign system 100 in a field 704. In one embodiment, said warning sign system 100 can be used in a field 704 (such as an industrial site) comprising an industrial equipment such as a wellhead 706 which can produce hydrocarbons such as natural gas. In one embodiment, said field 704 can be bordered on one side by a public road 702 and said wellhead 706 can be accessible by a private road 708. In one embodiment, said wellhead 706 can produce a toxic chemical being hazardous to the health of animals and humans; In one embodiment, said toxic chemical can escape from said wellhead 706 into a toxic zone 714 and then dissipate across said field 704 in a plume 712. In one embodiment, said warning sign system 100 can be a first distance 716 from said public road 702 and said wellhead 706 can be a second distance 718 from said warning sign system 100.

In one embodiment, said toxic zone 714 can comprise a 300 ppm concentration of said toxic chemical and said plume 712 can comprise a 10 ppm. In one embodiment, said toxic chemical can comprise $H_2S$. In one embodiment, said first distance 716 and said second distance 718 can each comprise 200 meters, but they need not be identical in length.

In one embodiment, said field 704 can comprise an oil or gas field site where hazardous substances may be released. In one embodiment, said plume 712 can comprise a 10-ppm $H_2S$ concentration profile about 1 meter above the ground), a plume-dimension scale (meters measured approximately along its axis) and the security system of the present invention (airfoil pointing element adjacent entry road). The source for this hypothetical plume (said plume 712) is a ruptured trans-critical fluid injection line. The escaping fluid components (mol. fractions) are: $CO_2$ (0.51), $H_2S$ (0.45) and $CH_4$ (0.04). The RPID tags of the security system are positioned with a clear field of view of a vehicle approaching along said public road 702 and/or said private road 708. For this example, a visitor would be able to see the site features and the warning sign movements/displays from the public road.

In one embodiment, said mast 104 can be planted in a ground surface of said field 704 or to a fence or pole surrounding said field 704. In one embodiment, said warning sign system 100 is attached at a gate to said field 704.

Figure 8A:
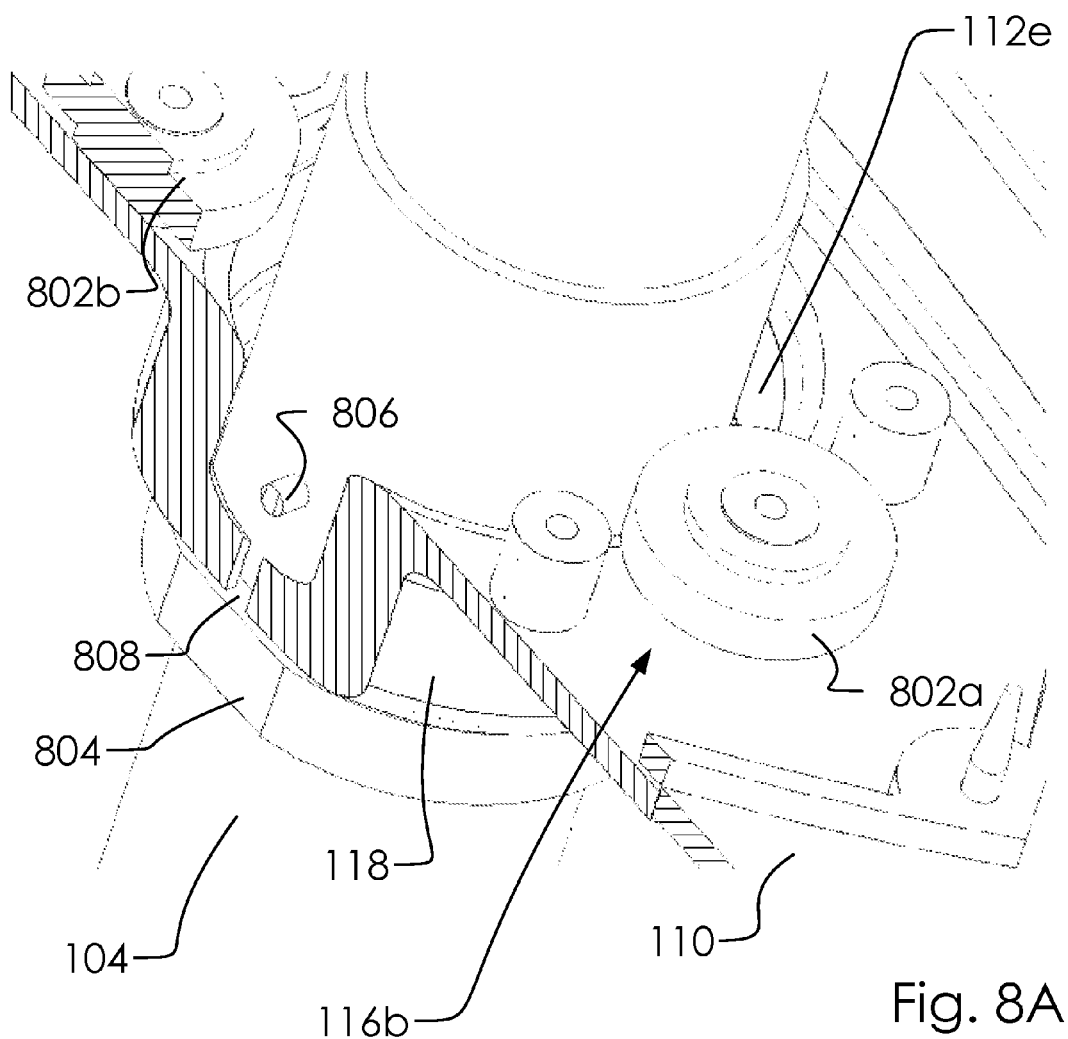
FIGS. 8A and 8B illustrate a perspective overview and an elevated top view of said bottom 110 and said lower bearing assembly 116b.
Figure 8B:
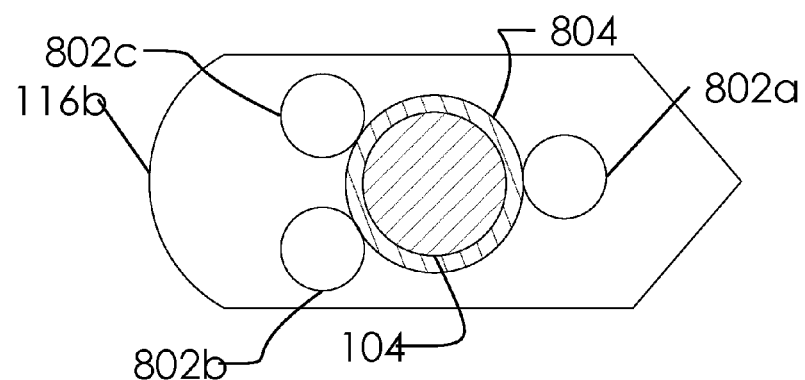

FIGS. 8A and 8B illustrate a perspective overview and an elevated top view of said bottom 110 and said lower bearing assembly 116b. In one embodiment, said upper bearing assembly 116a can be attached to said top 108 and said lower bearing assembly 116b can be attached to said bottom 110. In one embodiment, said one or more bearing assemblies can allow said sign portion 102 to rotate freely on said central axis 302 relative to said mast 104. In one embodiment, said one or more bearing assemblies can comprise a plurality of bearings (which can comprise a first bearing 802a, a second bearing 802b and a third bearing 802c). In one embodiment, said plurality of wheels can interface with a portion of said mast 104 providing a bearing for said sign portion 102 to rotate upon.

In one embodiment, attaching said sign portion 102 to said mast 104 can comprise: sliding a sleeve 804 having a retainer pin 806 said second distance 308 down said mast 104; attaching said sleeve 804 to said mast 104; sliding said top 310 and said upper portion 312 of said mast 104 through said plurality of mast apertures of said sign portion 102; sliding said retainer pin 806 through a notch 808 in said lower collar 118; and attaching said upper plug assembly 114 to said top 310 of said mast 104.

In one embodiment, said lower collar 118 and said upper plug assembly 114 can be aligned such that said sign portion 102 does not develop lift as said plurality of air flows 600 increase since said leading edge 602 can have a 1 degree nose down angle and therefore have a 1 degree downward thrust holding said sign portion 102 on said mast 104

Figure 9A:
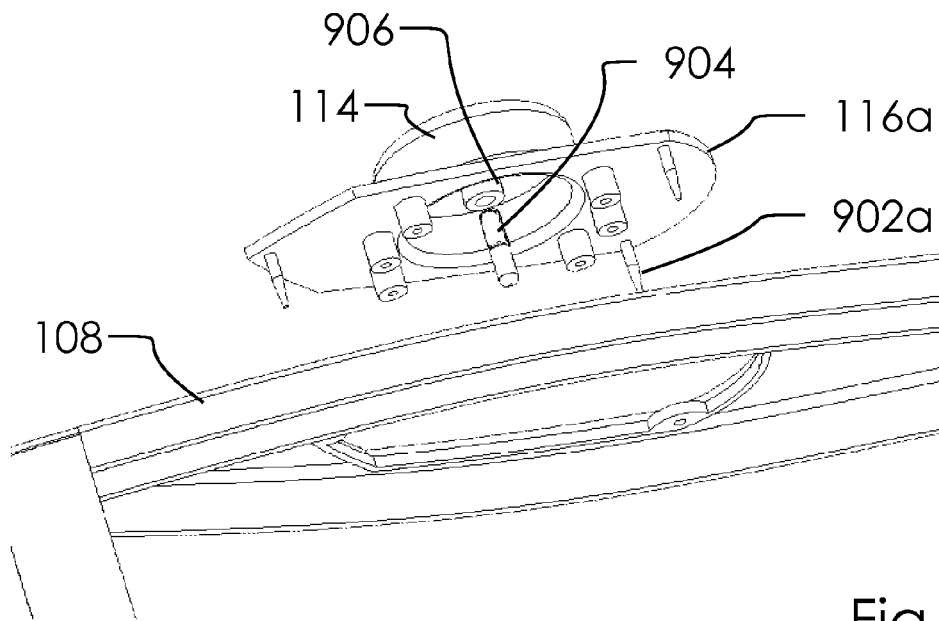
FIGS. 9A and 9B illustrate a perspective front side detailed view of said upper bearing assembly 116a and a perspective overview of said upper bearing assembly 116a, with each detached from said sign portion 102.
Figure 9B:
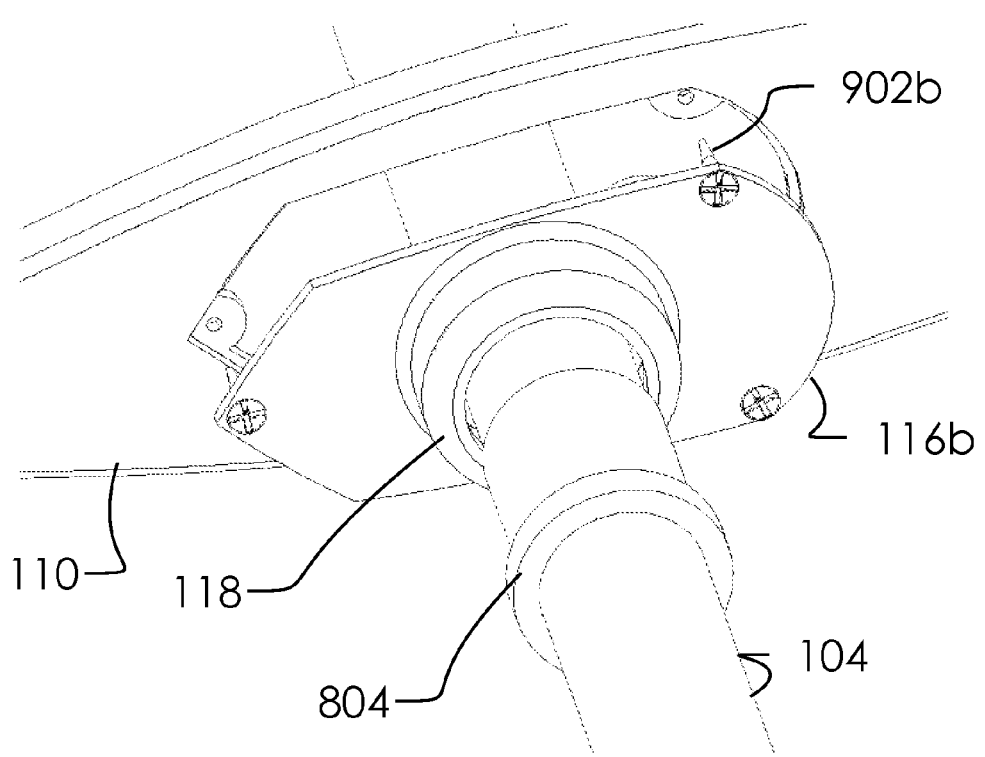

FIGS. 9A and 9B illustrate a perspective front side detailed view of said upper bearing assembly 116a and a perspective overview of said upper bearing assembly 116a, with each detached from said sign portion 102.

In one embodiment, said one or more bearing assemblies can releaseably attach to said sign portion 102. For example, in one embodiment, said upper bearing assembly 116a can releaseably attach to said top 108 and said lower bearing assembly 116b can releaseably attach to said bottom 110. In one embodiment, said one or more bearing assemblies can attach to said sign portion 102 with a one or more screws such as a first set of screws 902a and a second set of screws 902b.

In one embodiment, said upper plug assembly 114 can be a portion of said upper bearing assembly 116a, and said lower collar 118 can be a portion of said lower bearing assembly 116b.

In one embodiment, said upper bearing assembly 116a can comprise a socket 906 capable of receiving a dowel rod 904, both of which can be aligned with said central axis 302 of said mast 104. In one embodiment, a portion of said top 108 of said mast 104 can attach to said dowel rod 904 and rotate thereupon.

In one embodiment, said sleeve 804 can provide a protective barrier between said lower bearing assembly 116b of said sign portion 102 and said mast 104. In one embodiment, said sleeve 804 can comprise an anti-corrosive material, or said mast 104 can be made of such an anti-corrosive material.

FIGS. 10A, 10B, 10C, 10D and 10E illustrate a perspective overview of said sign portion 102 with a handheld reader 1003, a short range communication chip 1019, a system-on-a-chip 1020, a component diagram 1010, and an encasement 1022 for said system-on-a-chip 1020.

In one embodiment, said handheld reader 1003 can comprise a predetermined personal handheld devices including a known, portable RFID tag reader and/or a smartphone for graphic web access and for transferring spoken or key-entered passwords, said devices allowing confirmation of a particular level of security clearance and enabling physical access to the site and, if needed, maximum-security-web-access to critical site information prior to entry therein.

In one embodiment, said warning sign system 100 can further comprise said short range communication chip 1019 and said system-on-a-chip 1020 either of which can be attached to a portion of said sign portion 102 (such as a first location 1002a at said lower collar 118, a second location 1002b at a portion of said bottom 110, or a third location within said one or more faces. In every case, attention is given to ensure that a weight of said sign portion 102 does not alter a balance of said sign portion 102 along said horizontal axis 606.

In one embodiment, said short range communication chip 1019 can comprise an NFC chip, an RFID, or another short range communication protocol and system, as is known in the art.

In one embodiment, said system-on-a-chip 1020 can comprise a processors 1005, a memory 1006, a communication hardware components 1007, a digital compass 1011, a location sensor 1012, a temperature sensor 1014, a one or more LEDs 1016, a chemical sensors 1017 and a power system 1018. In one embodiment, said location sensor 1012 can comprise a GPS sensor. Said temperature sensor 1014 can comprise a probe 1022 for sensing a temperature at or around said one or more computers. Said one or more LEDs 1016 can be lighted to provide a visible signal from said system-on-a-chip 1020. Said power system 1018 can comprise a battery, attached to and powering said system-on-a-chip 1020.

In one embodiment, more than one of said warning sign system 100 can be distributed across said field 704; wherein, said system-on-a-chip 1020 of a first warning sign can communicate with the same component on a second warning sign. Accordingly, said warning sign system 100 can comprise a distributed network of warning signs, as would be obvious to one in the art.

In one embodiment, data collected by said system-on-a-chip 1020 can be collected on a server and processed into useful information at said server.

In one embodiment, said system-on-a-chip 1020 can be stored in said encasement 1022.

FIGS. 11A and 11B illustrate shows five typical, traditional risk/warning images indicating different hazards from toxic-poisonous to flammable/explosive classifications. Such images form the user-friendly link of the present "logical QR emblems" when they are superimposed onto the basic data-matrix cluster. While these known graphics illustrate a few warning classes, other graphics which are also used in the present invention include: logo symbols of a particular government agency/business or ideograph symbols of selected professions/activities relevant to the site.

FIG. 11B illustrates how the basic components of the Denso•type QR code are meshed with the superimposed traditional, specific-class warning image. The legend (below) identifies each feature.

At this point the Applicants wish to incorporate by reference a discussion made in their previous (and currently co-pending) application. Specifically, utility application Ser. No. 13/066,382 at ¶¶[0024]-[0150].

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A wind-articulated, warning sign system responsive to oblique wind currents acting external to surfaces of its exposed, non-flat-sheet and non-fabric structural elements and which provides a functional-airfoil-cross-section with surface configured to display and provide emergency critical technical data for specific classes of regular and emergency visitors to the entrance portal of an industrial site where large quantities of dangerous substances, including, radioactive, flammable, explosive, corrosive, oxidizing, asphyxiating, biohazardous, toxic, pathogenic, or allergenic substances are handled and which substances might be released by accident or by terrorist attack and dispersed by winds into the local environment, the system comprising:
 a mast which extends vertically above a surface;
 a wind-responsive, stiffened, monocoque panel formed of thin sections of lightweight materials into the general shape of a polygon;
 the panel being a smooth, thin, symmetrical airfoil, said panel defined by a one or more faces being opposed to one another (comprising a first face and a second face);
 said one or more faces being panel-lateral-face surfaces and having characteristic span, chord, thickness, plane of symmetry, a center of lift, a leading edge, a trailing edge, a root and an outboard tip;
 the panel further connected to said mast for unobstructed, 360 degree rotation thereabout;
 said panel being pivotably mounted to the mast by mechanical connection to a plurality of ribs comprising a support beams;
 said support beams being lightweight monocoque which have an airfoil shape in plan view, extend perpendicular to said mast axis upstream of the leading edge of said panel;
 said support beams providing beam-lateral-display surfaces and mechanical connection of said panel to the mast and adapting it for full rotation thereabout at wind velocities as low as 0.5 m/sec; and each of said support beams being provided with a one or more bearing assemblies being low-friction bearings adapted for thrust loads and for rotation under extreme weather conditions.

2. The secure warning system of claim 1 comprising:

said panel being an airfoil having the following characteristics 250<span, mm<1000; 250<chord, mm<1000, 10<thickness L4, and mm<100;

said panel comprises a leading edge;

said leading edge is parallel to said mast axis; its span being oriented in a vertical plane parallel to the axis of said mast;

said airfoil panel being a rectangular polygon and fixed between a first lower beam at its root and a second upper beam at its tip, both said beams being attached to said mast for 360-degree rotation thereabout;

said offset, L1, of airfoil center of lift re the pivot axis being in the range 0.2*chord to 0.6*chord;

said airfoil panel being able to generate lift forces in the range 0.1<force, N<0.5 at 3-degree oblique-angle wind velocities as low as 0.3 m/sec; and said panel-face surfaces adapted for direct application of thin-layer-designs using known all-weather paints and pigments and known sign-image-generation methods.

3. The secure warning system of claim 1 comprising:

said panel being quadrilateral in the form of a parallelogram, a rhombus or a trapezoid with its leading edge not parallel to the mast axis;

said beams and bearings being adapted for rotation under a force of about 0.1N applied perpendicular to one of said lateral surfaces at said airfoil center of lift;

said mast, beams and panel being designed to resist drag forces of strong winds in the range 2<velocity, m/sec <30 with elastic deflections of less than 1%;

said mast-mounted beam-&-panel assembly being adapted to rotate under 0.5-5 deg. oblique angle wind currents in the velocity range 3-40 m/sec and to align itself to the instant wind vector; and said panel-face surfaces being adapted for one or more of:
(a) semi-permanent fixation of known adhesive-backed warning signs in the form of known materials in the thickness range 0.05-3 mm, (b) permanent fixation of warning signs mated to panel-surface recesses using known technics to achieve a flush mounting of said signs in the thickness range 0.05-3 mm and (c) removable fixation of warning signs mated to panel-surface recesses using known securing technics to achieve weatherproof, substantially-flush mounting of said signs in the thickness range 0.05-3 mm.

4. The secure warning system of claim 1 comprising;

said panel being an airfoil having the following characteristics 250<span, mm<1000; 250<chord, mm<1000; 10<thickness L4, mm<100; its leading edge is generally parallel to said mast axis; its span being oriented in a vertical plane parallel to the axis of said mast;

said airfoil panel being a rectangular polygon and fixed at its root upon a support beam, said beam being attached to said mast for 360-degree rotation thereabout;

said offset, L1, of airfoil center of lift re the pivot axis being in the range 0.2*chord to 4*chord; and said panel-face surfaces adapted for direct application of thin-layer-designs using known all-weather paints and pigments and known sign-image-generation methods.

5. The secure warning system of claim 4 comprising:

said panel being quadrilateral in the form of a parallelogram, a rhombus or a trapezoid with its leading edge not parallel to the mast axis; and said panel-face surfaces being adapted for one or more of:
(a) direct application of thin-layer-warning-designs using known all-weather paints and pigments and known sign-image-generation methods, (b) semi-permanent fixation of known adhesive-backed warning signs in the form of known materials in the thickness range 0.05-3 mm, (c) permanent fixation of warning signs mated to panel-surface recesses using known technics to achieve a flush mounting of said signs in the thickness range 0.05-3 mm and (d) removable fixation of warning signs mated to panel-surface recesses using known securing technics to achieve weatherproof, substantially-flush mounting of said signs in the thickness range 0.05-3 mm.

6. The secure warning system of claim 5 comprising:

said beams and bearings being adapted for rotation under a force of about 0.1 N applied perpendicular to one of said lateral surfaces at said airfoil center of lift;

said mast, beams and panel being designed to resist drag forces of strong winds in the range 2<velocity, m/sec <30 with elastic deflections of less than 1%;

said mast-mounted beam-&-panel assembly being adapted to rotate under 0.5-5 deg. oblique-angle wind currents in the velocity range 3-40 m/sec and to align itself to the instant wind vector; and said panel-face surfaces being adapted for one or more of:
(a) direct application of thin-layer-warning-designs using known all-weather paints and pigments and known sign-image-generation methods, (b) semi-permanent fixation of known adhesive-backed warning signs in the form of known materials in the thickness range 0.05-3 mm, (c) permanent fixation of warning signs mated to panel-surface recesses using known technics to achieve a flush mounting of said signs in the thickness range 0.05-3 mm and (d) removable fixation of warning signs mated to panel-surface recesses using known securing technics to achieve weatherproof, substantially-flush mounting of said signs in the thickness range 0.05-3 mm.

7. The secure warning system of claim 4 comprising:

said beam is provided with one or more counterweights of materials exhibiting a density of at least 2000 kg/m3 and said counterweights are all offset upstream from said mast axis, the ensemble providing a combined moment to balance the opposing static moment in the panel plane of symmetry due to the combined mass of beam and panel portions located downstream of the pivot axis, wherein said counterweights are one or more of: (a) all internal or all external to said beam surface, (b) at least one of said counterweights is external, (c) all of said counterweights are permanently attached and (d) at least one of said counterweights is separately and removably attached; and said panel is provided at its tip with one or more known winglets each having optimized design features including: cant angle, twist distribution, sweepback and taper ratio whereby vibration and drag of said panel are reduced under wind velocities of more than 10 m/sec.

8. The secure warning system of claim 6 comprising:

said beam is provided with one or more counterweights of materials exhibiting a density of at least 2000 kg/m3 and said counterweights are all offset upstream from said mast axis, the ensemble providing a combined moment to balance the opposing static moment in the panel plane of symmetry due to the combined mass of beam and panel portions located downstream of the pivot axis, wherein said counterweights are one or more of: (a) all internal or all external to said beam surface, (b) at least one of said counterweights is external, (c) all of said counterweights are permanently attached and (d) at least one of said counterweights is separately and removably attached; and said panel is provided at its tip with one or more known winglets each having optimized design features including: cant angle, twist distribution, sweepback and taper ratio whereby vibration and drag of said panel are reduced under wind velocities of more than 10 m/sec.

9. The secure warning system of claim 4 comprising:

said beam is provided with one or more counterweights of materials exhibiting a density of at least 2000 kg/m3 and said counterweights are all offset upstream from said mast axis, the ensemble providing a combined moment to balance the opposing static moment in the panel plane of symmetry due to the combined mass of beam and panel portions located downstream of the pivot axis, wherein said counterweights are one or more of: (a) all internal or all external to said beam surface, (b) at least one of said counterweights is external, (c) all of said counterweights are permanently attached and (d) at least one of said counterweights is separately and removably attached; and said panel is provided at its tip with one or more known winglets each having optimized design features including: cant angle, twist distribution, sweepback and taper ratio whereby vibration and drag of said panel are reduced under wind velocities of more than 10 m/sec.

10. The secure warning system of claim 1 comprising:

said warning sign system comprises a short range communication chip; and each visitor to the site provided with predetermined personal handheld devices including a known, short range communication chip reader and/or a smartphone for graphic web access and for transferring spoken or key-entered passwords, said devices allowing confirmation of a particular level of security clearance and enabling physical access to the site and, if needed, maximum-security-web-access to critical site information prior to entry therein.

11. The secure warning system of claim 1 comprising:

said surface which said mast is attached to is a ground surface; and the mast being placed in a portion of a cleared and leveled area of ground surface about 10 m in radius, the mast having a width of about 40-70 mm and at least one mast-lateral-display surface visible to entering visitors.

12. The secure warning system of claim 1 wherein said airfoil is oriented so that its plane of symmetry lies parallel to the mast axis and its chord is perpendicular to the mast axis.

13. The secure warning system of claim 1 comprising:

said one or more panel-displays including text, and graphics to provide warning data along with related iconic symbols in grayscale and/or color; and each of said one or more faces provided with a one or more indicia of encoded and readable messages.

14. The secure warning system of claim 1 comprising:

said panel lateral-face surfaces being provided with one or more regulatory-compliant, retroreflective exterior signs indicating in text, colors, icons and special QR-type digital graphics, certain information on characteristics of the dangerous substances and the particular site, the QR codes facilitating password-controlled web access by the visitor's personal handheld devices to predetermined additional sensitive data, including layout diagrams.

15. The secure warning system of claim 1 comprising:

said lateral display surfaces of said mast and said one or more beams being provided with at least one secure, robust RFID-tag device oriented toward the direction from which visitors approach and which can be accessed by means of a visitor-carried, secure reader to obtain updated, critical or sensitive data on particular aspects of the site.

16. The secure warning system of claim 1 comprising:

whereby a visitor, having the use of a secure portable tag reader and/or smartphone, is informed prior to admittance or actual entry into the site, of relevant critical intelligence data, safety information about the site and instant risks of exposure to dangerous substances.

17. The secure warning system of claim 1 comprising:

said warning sign system further comprises a sleeve;

said sleeve attaches to said mast and defines an attachment point for a lower bearing assembly;

said one or more bearing assemblies comprises a upper bearing assembly at a top portion of said sign portion and said lower bearing assembly at a lower portion of said sign portion; wherein, attaching said sign portion to said mast comprises:

sliding said sleeve having a retainer pin down said mast;

attaching said sleeve to said mast; sliding said top and an upper portion of said mast through a plurality of mast apertures of said sign portion; sliding said retainer pin through a notch in a lower collar; and attaching an upper plug assembly to said top of said mast.

18. The secure warning system of claim 1 comprising:

said one or more bearing assemblies comprise delta bearing comprising three bearings surrounding said mast and allowing said sign portion to rotate freely around said mast.

19. The secure warning system of claim 1 comprising:

said warning sign system comprises a one or more leading edge lights attached to said leading edge of said sign portion, a one or more trailing edge lights attached to said trailing edge of said sign portion; and said one or more leading edge lights are a different color from said one or more trailing edge lights.

20. The secure warning system of claim 1 comprising:

said warning sign system comprises a system-on-a-chip having a processors, a memory, a communication hardware components, a digital compass, a one or more LEDs, a chemical sensors and a power system.

* * * * *